Aug. 11, 1936.  R. W. ATKINSON  2,050,991
CABLE AND METHOD OF MAKING
Filed June 14, 1930
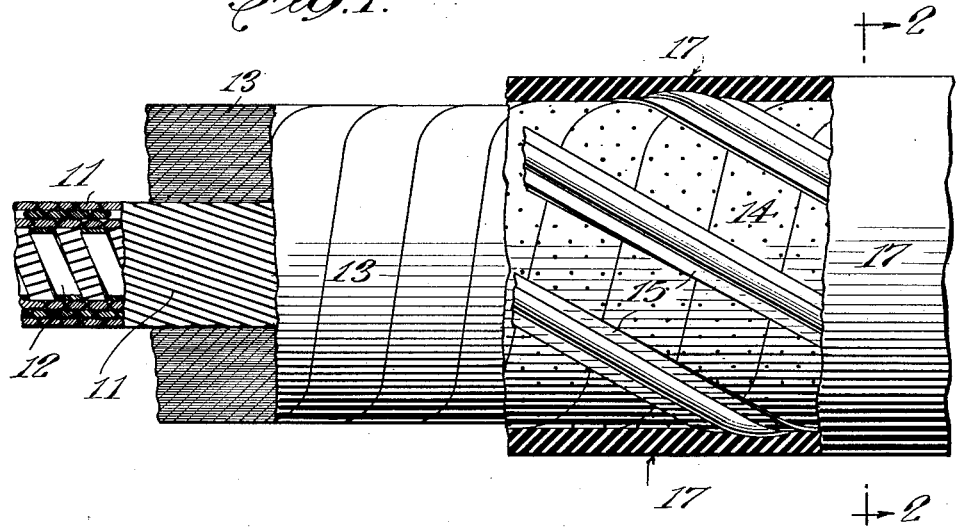
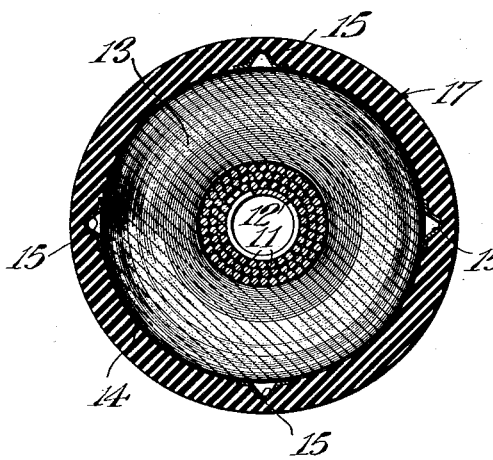
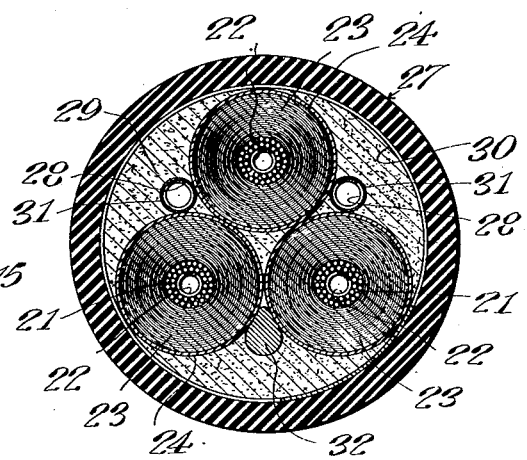
INVENTOR
Ralph W. Atkinson
BY
Emery, Booth, Varney & Whittemore
ATTORNEYS Patented Aug. 11, 1936

2,050,991

UNITED STATES PATENT OFFICE 2,050,991

CABLE AND METHOD OF MAKING

Ralph W. Atkinson, Perth Amboy, N. J., assignor to General Cable Corporation, New York, N. Y., a corporation of New Jersey Application June 14, 1930, Serial No. 461,103

28 Claims. (Cl. 173—264)

This invention relates to sheathed, high-tension electric cables, and more particularly to such cables having included between the cable conductor or conductors and the sheath a body of insulating compound which fills all interstices and spaces within the sheath, and which is fluid or viscid at some or all temperatures within the normal operating temperature range of the cable. It is an object of this invention to provide an improved cable of the type described. Another object of the invention is to provide an improved method of manufacture of cable of the type described. Other objects and advantages of the invention will appear hereinafter.

This application is a continuation in part of the co-pending application of Ralph W. Atkinson for Letters Patent on Cable structure, filed January 25, 1927, Serial No. 163,393.

An illustrative embodiment of the invention selected merely for descriptive purposes is shown in the accompanying drawing, in which:

Fig. 1 is a plan view of a short section of single conductor cable having the sheath and insulation progressively removed and the parts shown partly in longitudinal section to disclose the construction.

Fig. 2 is a transverse section on the line 2—2 of Fig. 1; and

Fig. 3 is a transverse section through a three conductor cable embodying this invention.

Sheathed cable adapted for use at high voltages commonly has the conductor enveloped in a body of porous insulating material which serves to space and insulate the conductor from the sheath. In the case of multi-conductor cables the several conductors are individually insulated, and, prior to the application of the outer sheath, are assembled in parallel or twisted relation, usually with suitable fillers of porous material to form a substantially round core. Conveniently the individually insulated conductors in a multi-conductor cable may be held in assembled relation by means of a surrounding, spirally-wrapped, binding tape, for example, of steel.

The body of porous insulating material enveloping a cable conductor ordinarily is wrapped-on paper which preferably is thoroughly impregnated or saturated with an insulating compound filling all interstices in the porous insulation to improve the dielectric quality thereof. The impregnation usually takes place during the process of manufacture of the cable, either before or after the outer sheath has been applied, and preferably is done under a vacuum and heat to insure removal of all air and moisture. The insulating compound preferably completely fills all interstices and spaces within the cable sheath, exteriorly as well as interiorly of the porous insulation, which condition customarily is insured by maintaining at all times a pressure greater than atmospheric on the body of compound filling the cable sheath.

The insulating compound may and preferably will be fluid or semi-fluid at temperatures within the normal operating temperature range of the cable; for example it may be an oil. In order to expedite and insure the complete filling of all spaces within the cable sheath with insulating compound, whether normally fluid or viscid, the cable preferably is provided with one or more longitudinally extending channels or ducts. These channels may be provided in any one or more of several ways, for example: by employing a stranded hollow conductor; by using spacers between the insulated conductor and the cable sheath, or by providing longitudinally extending flutes on the inner surface of the sheath; or, in the case of multi-conductor cables, by providing longitudinally extending ducts in the filler spaces between the individually insulated conductors and the cable sheath.

Preferably, the envelope of insulation about a conductor is immediately surrounded by a thin, snugly-adherent, permeable envelope of conducting material which forms an electrostatic shield about the conductor. This thin conducting envelope conveniently is in the form of an attenuated integument of metal which ordinarily will be at or near ground potential when the cable is in service, thereby substantially relieving from electrical stress the region external to the shield.

In metallic sheathed cable installations the metal cable sheath is at or near ground potential, and usually is in direct contact with the thin shielding envelope, or envelopes in the case of multi-conductor cable, substantially throughout the length of the cable. The metal cable sheath serves as a parallel path of relatively great current carrying capacity for conducting current from the shielding envelope either direct to ground or to the cable end, whereby the shielding envelope will not carry any substantial current for any great distance. In such installations the shielding envelope may have a low current carrying capacity longitudinally of the cable without danger of damage to adjacent cable lengths in case of a short-circuit from the conductor to the shield in any cable length in the installation.

Without the provision of an additional parallel conducting path for the shield the short-circuit current might follow the thin shielding envelope along the cable for a great distance, and even to the cable end, which in the majority of instances would result in the destruction of the shield over the entire distance traveled by the short-circuit current. As will appear more fully hereinafter, this invention contemplates the provision of a non-metallic sheathed cable, and additional conducting means preferably are connected with the shielding envelope for relieving the envelope of destructive currents. Conveniently this additional conducting means is laid along the shielding envelope and in direct electrical contact therewith substantially throughout the length of the cable.

In single conductor cable the additional conductor conveniently takes the form of one or more metal strips wrapped spirally about the insulated and shielded conductor. The cable sheath ordinarily will be applied directly over the additional conductor, which may be designed to provide an oil channel extending longitudinally of the cable between the insulated conductor and the cable sheath. If the cable sheath conforms closely to the outer surface of the shielded conductor and the additional spirally wrapped conductor, the oil channel conveniently is provided by deforming the metal strip transversely into the form of an arch, whereby an oil channel is defined by the strip and the outer surface of the shielded conductor. Preferably the metal strip has extended surface contact with the shielding envelope to insure adequate electrical connection with the shielding envelope, and also to prevent damage to the envelope by pressure exerted inwardly on the strip.

In multi-conductor cable the additional conductor conveniently is laid in the space between the individually shielded conductors and the sheath, and in direct contact with the shielding envelopes substantially throughout the length of the cable. Since the shielding envelopes ordinarily are in direct contact one with another, a single additional conductor laid in the interval between and having extended surface contact with two shielding envelopes may provide an adequate conducting path for cables having more than two conductors.

Enclosing the insulated and shielded conductor or conductors is the outer sheath, which should be impervious to prevent damage to the cable insulation by the escape of insulating compound or by the ingress of air and moisture. The sheath also should be flexible, and preferably light in weight, in order to permit manipulation and to expedite handling of the cable during its shipment and installation. Furthermore, the sheath should be of such a character as adequately to protect the insulated conductor or conductors against mechanical injury during installation and operation.

Heretofore, in cables of the type described the outer sheath has been made of lead or of an alloy of lead. The weight of such a sheath is very great and comprises a substantial part of the total weight of the cable, thereby making the handling and installation of the cable difficult and costly. Since lead is an electrical conductor, there may be a substantial power loss and an undesirable heating in the sheath when the cable is in service, due to circulating currents induced in the sheath by the current flowing in the cable conductors. Metal sheaths are subject both to corrosion and electrolytic reactions when installed, and consequently in time may be perforated, permitting escape of the insulating compound and ingress of air and moisture, thereby destroying the integrity of the cable insulation and eventually resulting in a failure of the cable. In lead sheathed cable installed on bridges, or suspended from point to point, the vibration of rhythmic movement of the cable in time results in a crystallization of the lead sheath with a resultant necessity of replacement and interruption of service.

Lead and lead alloys which are used for cable sheaths are flexible, but, for all practical purposes, are not resilient. During shipment, installation and operation the cable will be subjected to a varying range of temperature which will result in an alternate expansion and contraction of the insulating compound with a resultant substantially continuous variation in the volume of the body of compound within the sheath. The expansion of the insulating compound results in an increase of pressure within the cable sheath, and unless some arrangement is provided to take care of this increase in the volume of the insulating compound the increase in pressure will result in the sheath being stretched or ruptured.

A lead sheath will stretch under the pressure of the expanding compound, but, since it is not resilient, will not contract again when the volume of the insulating compound contracts. Consequently, as the volume of the insulating compound decreases, bubbles or spaces which are not occupied by insulating compound will be formed within the cable sheath between the insulated conductor and the sheath, or within the body of porous insulating material. These bubbles of gas or vapor, particularly if they are formed within the body of porous insulating material, materially reduce the dielectric quality of the cable insulation and may in time result in the failure of the cable.

In cable installations where the insulating compound is a liquid, the variation in volume of the liquid within the cable may be compensated for by connecting the cable at one or more points with an expansible and contractible external reservoir containing an additional body of insulating compound under pressure, and preferably by also providing channels extending longitudinally along and within the cable to permit a free exchange of insulating compound between the external reservoir and all parts of the cable insulation.

During installation of lead sheathed cable it is necessary to bend the cable, as for example, when it is reeled, unreeled, and drawn into conduits. This bending of the cable generally results in a stretching or wrinkling of the cable sheath, with a probable consequent formation of bubbles of gas or vapor within the cable insulation. This danger may be avoided by connecting to the cable length during the time of shipment and installation an expansible and contractible reservoir containing an additional body of insulating compound under pressure.

If the cable sheath were resilient, so that it could expand and contract under pressure, any variation in the volume of the insulating compound within the cable sheath at any point throughout its length could readily be accommodated for by a stretching or contraction of the cable sheath and movement of the insulating compound radially of the cable without any substantial movement of compound longitudinally of the cable. The danger of bubbles of gas or vapor forming during the contraction of the insulating compound in a cable having a resilient sheath would be eliminated if the pressure on the compound initially was adjusted to a value such that at all temperatures to which the cable ever would be subject the pressure would be greater than that at which such bubbles form in the compound. It follows that it would be practicable to ship, install and operate oil-filled cables without providing any external oil reservoirs to accommodate for expansion and contraction of the insulating compound.

In addition to the saving in the initial cost of such an installation due to the elimination of oil-supply equipment, there would be a continuing economy in the cost of operation. The elimination of the oil reservoirs, oil piping, and pipe joints, all of which take up limited and costly manhole space and which are readily subject to damage, would remove one important source of trouble and consequently more nearly continuous service of the installation would be assured.

Since expansion of the insulating compound would be taken care of by movement of the compound radially of the cable, movement of insulating compound longitudinally of the cable during normal operation would be negligible. As a result the insulating compound within the cable might be viscous or relatively unyielding at normal operating temperatures without the danger of formation of bubbles of gas or vapor within the cable insulation or rupture of the cable sheath due to contraction and expansion of the insulating compound.

Oil-filled cables heretofore have been constructed exlusively with non-resilient sheaths of metal, and the expansion and contraction of the oil has been taken care of by connecting to the cable an external body of oil under pressure. According to this invention a cable is provided which has a resilient sheath capable of variation in cross-sectional area and which adequately accommodates for expansion and contraction of the insulating compound substantially without the provision of external reservoirs of compound connected to the cable. For convenience in description such a sheath will be referred to as a radially expansible and contractible sheath.

The outer sheath of the cable preferably is an impervious wall of a suitable tough, resilient insulating material which is relatively light in weight. The insulating material preferably will be age and abrasive resistant, as well as highly resistant to acids and alkalies, and the sheath will be of a thickness sufficient to afford adequate mechanical protection to the insulated conductor or conductors. Such a sheath will be elastic, and can expand and contract radially as the volume of the insulating compound within the cable sheath varies. Since the sheath may expand and contract radially throughout the length of the cable, the actual variation in sheath diameter at any point in the cable length will be small, probably not more than a few hundredths of an inch in the majority of cables.

The cable sheath and the insulating compound preferably will be substantially mutually non-reactive in order to prevent destruction of the sheath and compound. Merely by way of example the sheath may be made of a flexible vulcanized rubber compound having a composition which renders it highly oil resistant, and the compound may be an oil which is substantially non-reactive with rubber, such as castor oil.

Referring to the drawing, Figs. 1 and 2 disclose a single conductor cable illustrating the invention. The cable conductor conveniently is of the hollow core type consisting of a central spiral coil 12, which may be of spring steel, and which supports the spiralled conducting strands 11 constituting the cable conductor. The spiral coil 12 defines a conduit permitting relatively free circulation of insulating compound longitudinally of the cable during manufacture, installation and service, and the assembly of the parts making up the conductor will be such as to permit movement of the insulating compound through the wall of the hollow core between the conduit and the insulation 13 which surrounds the conductor.

The insulation 13 preferably is a porous body of fibrous material, and may be wrapped-on paper which, before the cable is placed in service, is thoroughly impregnated with a suitable insulating compound, for example an oil.

The insulated conductor is immediately surrounded by a snugly adherent, permeable, metallic envelope 14. The continuity of this metallic envelope 14 as an isolated conductor extending longitudinally of the cable is broken by means of one or more members 15 of conducting material extending along the insulated and shielded conductor in contact with the envelope 14. The members 15, of which four are shown in the drawing, conveniently may be of the arched form shown, and preferably are spiralled about the cable with a relatively long lay, whereby oil channels extending longitudinally of the cable are provided between the insulated conductor and the cable sheath.

Enclosing the insulated and metal-enveloped conductor exteriorly of the members 15 is an impervious wall 17 of resilient insulating material, for example vulcanized rubber, which forms an elastic expansible and contractible sheath for the cable.

Fig. 3 shows a three conductor cable illustrating the invention. Each of the cable conductors comprises a spiral coil 22 defining a conductor about which are spiralled the conducting strands 21. The conductor is enclosed in a body of porous insulation 23, conveniently wrapped on paper, which is immediately surrounded by a snugly-adherent, permeable, metallic envelope 24. Three conductors insulated in this manner are assembled with suitable filler material 29 to form a substantially round core which may be bound together with a surrounding spiralled wrapping 30, for example a steel tape.

Conveniently one or more channels 28 are provided in the filler space between the conductors to permit free movement of insulating compound longitudinally of the cable. These channels 28 may take any suitable form, for example helical supporting members, such as spiralled steel springs, overlaid with a thin layer 31 of wrapped porous paper, the paper preventing obstruction of the channels by the filler material 29.

Additional conducting means for relieving the shielding envelopes 24 of excessive current is provided, for example a conductor 32 lying in the valley between two of the shielded conductors 21, and preferably having extended surface contact with the envelopes 24 substantially throughout the length of the cable. Surrounding the assembled core exteriorly of the binding tape 30 is an elastic outer sheath 27 of insulating material, such as rubber.

It will be understood that cable made in accordance with this invention may be dried and impregnated in any suitable manner, either before or after the impervious outer sheath has been applied. Where the outer sheath is made of material requiring treatment after it is in place, as in the case of rubber which requires vulcanization, difficulty may be experienced in so treating the sheath if the conductor insulation previously has been impregnated. Such difficulty may be avoided by impregnating the porous insulation with the insulating compound after the treatment of the sheath has been completed. By way of example, the cable may be partially dried prior to the application of the outer sheath, and then preferably maintained in a dried and heated condition until after the elastic sheath is in place. The sheath may then be suitably treated, as by vulcanization in the case of rubber, and drying of the porous insulation may be completed by heating the cable insulation and simultaneously applying to the ends of the cable a vacuum to withdraw the air and any remaining moisture. Conveniently the dried cable may be flushed with an inert gas to remove any last traces of air or moisture.

Impregnation of the dried cable with an insulating compound may readily be accomplished by means of the oil ducts extending longitudinally of the cable within the sheath. If the outer resilient sheath is of rubber, it will ordinarily be vulcanized in place under pressure, and, if the cable is filled with insulating compound prior to vulcanization of the sheath, means must be provided at the ends of the cable to accommodate for the expansion of the insulating compound occasioned by the heating of the rubber during vulcanization. For this additional reason insulating compound preferably is not admitted to the interior of the cable until after the outer sheath has been substantially completed.

After the sheathed cable has been impregnated and filled with insulating compound, pressure is applied to the body of insulating compound within the cable sheath, the cable ends are sealed off in any suitable manner, and the cable is then ready for testing or shipment. The inital pressure applied to the insulating compound within the cable prior to sealing off the sheathed ends preferably will be such that it will prevent the formation of bubbles of gas or vapor in the cable insulation at all temperatures to which the sealed cable will be subjected, and under all conditions of shipment and installation.

The application of such an initial pressure to the insulating compound prior to sealing the cable ends results in a stretching of the expansible and contractible cable sheath, and provides a reserve supply of insulating compound between the cable sheath and the insulated conductor. As the insulated compound contracts in volume, for example as the temperature drops, the cable sheath contracts and forces this reserve supply of oil into the cable insulation, thereby preventing the formation of bubbles of gas or vapor. It will be obvious that the initial pressure to be applied to the insulating compound may be readily computed from the dimensions of the cable, the characteristics of the insulating compound, and the temperatures to which the cable will be subjected.

It will be seen that this invention provides a cable filled with an insulating compound and having a radially expansible and contractible sheath, whereby the integrity of the cable insulation is maintained at all times and under all conditions. The impregnating compound for the cable is self-contained and self-sufficient, and external reservoirs and supply tanks for impregnating compound are eliminated. An improved cable having a non-metallic sheath and shielded conductors is provided. Cable constructed in accordance with this invention is more economical to manufacture, ship, install, operate and maintain, and an improved method of manufacture is provided.

It will be understood that the invention is not to be limited to the illustrative embodiment disclosed, but may be variously modified and embodied within the scope of the claims.

I claim:

1. A cable for transmitting electric power at high voltages sheathed in a sheath of non-conducting material containing within the sheath an insulated conductor enclosed in an attenuated integument of metal comprising an electrostatic shield, said metal being sufficiently thin to conform snugly to the surface of the insulation and because of this thinness being inadequate to carry the current of an electric power fault without destruction of the shield, together with a strand of conducting material of a size adequate, in conjunction with the shielding layer, to carry the current of an electric power fault without damage to the shielding layer, said strand being grounded at its ends, and contacting substantially throughout its length with the metal integument of the insulated conductor.

2. A cable for transmitting electric power at high voltages sheathed in a sheath of non-conducting material containing within the sheath an insulated conductor enclosed in an attenuated integument of conducting material comprising an electrostatic shield, said conducting material being sufficiently thin to conform snugly to the surface of the insulation and because of this thinness being inadequate to carry the current of an electric power fault without destruction of the shield, together with an additional conductor of a size adequate, in conjunction with the shielding layer, to carry the current of an electric power fault without damage to the shielding layer, said additional conductor contacting substantially throughout its length with the said conducting integument of the insulated conductor.

3. The structure of claim 2, the said additional conductor being shaped to extended surface contact with the insulated and metal enclosed conductor.

4. A cable for transmitting electric power at high voltages sheathed in a sheath of non-conducting material and containing within the sheath an insulated conductor enclosed in an attenuated integument of metal comprising an electrostatic shield, said metal being sufficiently thin to conform snugly to the surface of the insulation and because of this thinness being inadequate to carry the current of an electric power fault without destruction of the shield, in combination with an additional conductor substantially co-extensive with said cable, said additional conductor being electrically connected with said integument to provide a parallel path for currents flowing in said integument longitudinally of said cable and being of a size adequate, in conjunction with the shielding layer, to carry the current of an electric power fault without damage to the adjacent insulation.

5. A cable for transmitting electric power at high voltages sheathed in a sheath of non-conducting material and containing within the sheath an insulated conductor enclosed in an attenuated integument of metal comprising an electrostatic shield, said metal being sufficiently thin to conform snugly to the surface of the insulation and because of this thinness being inadequate to carry the current of an electric power fault without destruction of the shield, in combination with additional conducting means for conducting electric currents from said integument to ground, said additional conducting means being of a size adequate, in conjunction with the shielding layer, to carry the current of an electric power fault without damage to the shielding layer.

6. A cable for transmitting electric power at high voltages containing within a sheath an insulated conductor enclosed in an attenuated integument of metal comprising an electrostatic shield, said metal being sufficiently thin to conform snugly to the surface of the insulation and because of this thinness being inadequate to carry the current of an electric power fault without destruction of the shield, the so-enclosed insulated conductor being contained within a larger body of insulation, together with a strand of conducting material, grounded at its ends, within such larger body of insulation external to the insulated and enclosed conductor, said strand making contact with the integument of metal which surrounds the insulated conductor and being of a size adequate, in conjunction with the shielding layer, to carry the current of an electric power fault without damage to the shielding layer.

7. A cable for transmitting electric power at high voltages sheathed in a sheath of non-conducting material, containing within the sheath a plurality of individually insulated conductors, each enclosed in a thin integument of conducting material comprising an electrostatic shield, said conducting material being sufficiently thin to conform snugly to the surface of the insulation and because of this thinness being inadequate to carry the current of an electric power fault without destruction of the shield, and a ground wire extending longitudinally along said cable within said sheath between the insulated conductors in electrical connection with said shields and being of a size adequate, in conjunction with the shielding layers, to carry the current of an electric power fault without damage to the shielding layers.

8. A cable for transmitting electric power at high voltages containing within a sheath a plurality of individually insulated conductors, each insulated conductor individually enclosed in a conducting shield sufficiently thin to conform closely at all times to the surface of the insulation and because of such thinness being inadequate to carry the current of an electric power fault without destruction of the shields, and a ground wire extending longitudinally along said cable within said sheath between the insulated conductors and electrically in parallel with said shields, said ground wire being of a size adequate, in conjunction with the shielding layers, to carry the current of an electric power fault without damage to the shielding layers.

9. In sheathed high tension electric cable, the combination of a conductor, an enveloping body of porous insulating material saturated with an insulating oil, a thin layer of conducting material closely overlying and shielding the porous insulating material, an additional conductor extending longitudinally of the cable and connected electrically in parallel with the thin conducting layer, a relatively thick impervious covering of resilient vulcanized rubber, substantially non-reactive with the insulating oil, surrounding the insulated and shielded conductor and the said additional conductor and forming an expansible and contractible sheath, whereby changes in the volume of the insulating oil within the cable sheath may be accommodated for by radial expansion and contraction of the sheath, and a self-sufficient body of oil filling all interstices and spaces within the cable sheath, and under pressure which will prevent the formation of bubbles at all temperatures to which the cable may be subjected.

10. In sheathed electric cable, the combination of a conductor, an enveloping body of porous insulating material saturated with an insulating compound, a thin layer of conducting material closely overlying and shielding the porous insulating material, an additional conducting member extending along the insulated conductor exteriorly of the thin conducting layer and electrically parallel therewith, a relatively thick impervious covering of resilient insulation, substantially non-reactive with the insulating compound, surrounding the insulated conductor exteriorly of said thin conducting layer and the said additional conducting member to form an expansible and contractible sheath, whereby changes in the volume of the insulating compound may be accommodated for by radial expansion and contraction of the sheath, and a body of insulating compound under pressure which will prevent the formation of bubbles at all temperatures within the normal operating temperature range of the cable filling all interstices and spaces within the cable sheath.

11. In sheathed, high tension electric cable, the combination of a conductor, an enveloping body of porous insulating material saturated with an insulating oil, a thin layer of conducting material closely overlying and shielding the porous insulating material, a relatively thick impervious covering of resilient insulation, substantially non-reactive with the insulating oil, surrounding the insulated conductor exteriorly of said thin conducting layer and forming an expansible and contractible sheath, whereby changes in the volume of the oil may be accommodated for by radial expansion and contraction of the sheath, and a body of oil under pressure greater than atmospheric at all temperatures within the normal operating temperature range of the cable filling all interstices and spaces within the cable sheath.

12. In sheathed electric cable, the combination of a conductor, an enveloping body of porous insulating material saturated with an insulating compound, a thin layer of conducting material pervious to the insulating compound closely overlying and shielding the porous insulating material, a relatively thick impervious covering of resilient vulcanized rubber surrounding the insulated conductor exteriorly of said thin conducting layer and forming an expansible and contractible sheath, said insulating compound and the rubber being in contact with each other and mutually non-reactive, whereby changes in the volume of the insulating compound may be accommodated for by radial expansion and contraction of the sheath, and a body of insulating compound under pressure which will prevent the formation of bubbles at all temperatures within the normal temperature range of the cable filling all interstices and spaces within the cable sheath.

13. In sheathed electric cable, the combination of a conductor, an enveloping body of porous insulating material saturated with an insulating compound, a thin layer of conducting material pervious to the insulating compound closely overlying and shielding the porous insulating material, a relatively thick impervious covering of elastic insulation surrounding the insulated conductor exteriorly of said thin conducting layer and forming an expansible and contractible sheath, said insulating compound and the elastic insulation being in contact with each other and mutually non-reactive, whereby changes in the volume of the insulating compound may be accommodated for by radial expansion and contraction of the sheath, and a body of insulating compound under pressure which will prevent the formation of bubbles contained wholly within and filling all interstices and spaces within the cable sheath.

14. In sheathed electric cable, the combination of a conductor, an enveloping body of porous insulating material saturated with an insulating oil, a thin layer of conducting material pervious to the insulating oil closely overlying and shielding the porous insulating material, an impervious covering of resilient vulcanized rubber enclosing the insulated conductor and constituting an outer sheath, said oil and rubber being in contact with each other and mutually non-reactive, whereby changes in the volume of the insulating oil may be accommodated for by radial expansion and contraction of the sheath, and a body of oil under pressure which will prevent the formation of bubbles at all temperatures to which the cable may be subjected filling all interstices in the porous insulating material and all spaces within the cable sheath.

15. In sheathed, high tension electric cable, the combination of a conductor, an enveloping body of porous insulating material impregnated with an insulating compound, a thin layer of conducting material closely overlying and shielding the impregnated insulating material, and a relatively thick impervious covering of resilient vulcanized rubber which is mutually non-reactive with the insulating compound and which encloses the insulated conductor exteriorly of said thin conducting layer to form an expansible and contractible sheath, whereby changes in the volume of insulating compound may be accommodated for by radial expansion and contraction of the cable sheath.

16. In cable for transmitting electric power at high voltages, the combination of a conductor, an enveloping body of porous insulating material impregnated and filled with an oil, and a unitary impervious covering of resilient insulation mutually non-reactive with the oil surrounding the insulated conductor in contact with the oil and constituting a radially expansible and contractible outer sheath which provides the mechanical protection for the insulated conductor and which by radial expansion and contraction accommodates for changes in the volume of the insulating oil resulting from variations in the cable temperature.

17. In cable for transmitting electric power at high voltages, the combination of a conductor, an enveloping body of porous insulating material impregnated and filled with an insulating oil, and a relatively thick, unitary, impervious covering of resilient insulating material mutually non-reactive with the insulating oil enclosing the insulated conductor in contact with the insulating oil and constituting an expansible and contractible outer sheath which provides the mechanical protection for the insulated conductor and which by radial expansion and contraction accommodates for changes in the volume of the insulating oil resulting from variations in the cable temperature.

18. In sheathed, high tension electric cable the combination of a conductor, an enveloping body of porous insulating material impregnated with an insulating oil, an impervious, unitary covering of elastic, nonmetallic material mutually non-reactive with the insulating oil enclosing the insulated conductor in contact with the insulating oil and forming by reason of the elasticity of the material an expansible and contractible outer sheath, and a body of insulating oil under pressure which will prevent the formation of bubbles at all temperatures within the normal operating temperature range of the cable filling all interstices and spaces within the cable sheath, the construction being such that changes in the volume of the insulating oil may be accommodated for solely by radial expansion and contraction of the cable sheath.

19. In cable for transmitting electric power at high voltages, the combination of a conductor, an enveloping body of porous insulating material impregnated and filled with an insulating compound, a thin layer of conducting material pervious to the insulating compound closely overlying and shielding the impregnated insulating material, an impervious covering of resilient insulation enclosing the insulated and shielded conductor in contact with the insulating compound and forming an expansible and contractible outer sheath which by radial expansion and contraction accommodates for changes in the volume of the insulating oil resulting from variations in the cable temperature.

20. In an electric cable, the combination of an insulation-enveloped conductor, an elastic outer sheath consisting of a unitary wall of resilient non-metallic material of substantially uniform thickness, and a self-contained body of insulating compound under pressure, said insulating compound being in contact with the elastic sheath and mutually non-reactive therewith, the resilient non-metallic material being sufficiently elastic to follow variation in the volume of the contained insulating compound to prevent the formation of bubbles of gas or vapor at all temperatures to which the cable normally will be subjected.

21. In an electric cable, the combination of an insulation-enveloped conductor, a continuous, unitary, impervious, radially expansible and contractible sheath of resilient, non-metallic material and a self-sufficient body of liquid insulating compound under pressure filling all interstices and spaces within the sheath at all temperatures to which the cable normally will be subjected, said insulating compound being in contact with the resilient material of the sheath and mutually non-reactive therewith.

22. In cable for transmitting electric power at high voltages, the combination of an insulation-enveloped conductor, a resilient rubber sheath, and a body of liquid insulating compound under pressure greater than atmospheric filling all interstices and spaces within the sheath, said insulating liquid being in contact with the rubber and mutually non-reactive therewith.

23. In cable for transmitting electric power at high voltages, the combination of an insulation-enveloped conductor, a unitary sheath of elastic non-metallic material, and a body of liquid insulating material under pressure greater than atmospheric filling all interstices and spaces within the sheath, the said insulating liquid and the elastic material of the sheath being in contact with each other and mutually non-reactive.

24. In the manufacture of electric cable, the method which comprises enveloping a conductor in insulation, drying the insulated conductor to remove moisture therefrom, applying over the dry insulated conductor a sheath of plastic material in a relatively unstable state, curing the sheath by applying heat to change the material from a relatively unstable plastic state to one of more stable and resilient nature, evacuating the cable, and impregnating the insulation with an insulating compound.

25. In the manufacture of electric cable, the method which comprises enveloping a conductor in insulation, drying the insulated conductor to remove moisture therefrom, applying a resilient sheath to the dry insulated conductor, heat-treating the applied sheath, evacuating the cable, filling all interstices and spaces within the sheath with an insulating compound, applying a predetermined pressure greater than atmospheric to the compound to stretch the sheath so that the pressure will still be above atmospheric when the cable is subjected to lower temperatures, and sealing-off the ends of the cable while maintaining said predetermined pressure on the compound.

26. In the manufacture of electric cable, the method which comprises enveloping a conductor in insulation, applying an elastic sheath to the insulated conductor, evacuating the cable, filling all interstices and spaces within the sheath with an insulating compound, applying a predetermined pressure greater than atmospheric to the compound to stretch the sheath, and sealing-off the ends of the cable while maintaining said predetermined pressure on the compound, whereby at all temperatures to which the cable will be subjected the pressure on the compound will prevent the formation of bubbles of gas or vapor in the cable insulation.

27. In the manufacture of electric cable comprising a conductor enveloped with a wall of porous insulation and surrounded by an elastic sheath, the method which comprises evacuating the cable, filling all interstices and spaces within the sheath with an insulating compound, applying pressure greater than atmospheric to the compound to stretch the sheath and force an excess of insulating compound into the sheathed cable, and sealing-off the ends of the cable while maintaining positive pressure on the compound.

28. In the manufacture of electric cables comprising a conductor enveloped with a wall of porous insulation and surrounded by an elastic sheath, the method which comprises filling all interstices and spaces within the sheath with an insulating compound, applying a predetermined pressure greater than atmospheric to the compound to stretch the sheath and force an excess of insulating compound into the sheathed cable, and sealing-off the ends of the cable while maintaining positive pressure on the compound.

RALPH W. ATKINSON.